United States Patent
Wang

(10) Patent No.: US 7,126,077 B2
(45) Date of Patent: Oct. 24, 2006

(54) RESISTANCE WELDING OF HIGH STRENGTH STEELS

(75) Inventor: Pei-Chung Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 8 days.

(21) Appl. No.: 10/843,516

(22) Filed: May 10, 2004

(65) Prior Publication Data

US 2005/0247679 A1    Nov. 10, 2005

(51) Int. Cl.
    B23K 11/16    (2006.01)
    B23K 11/30    (2006.01)
(52) U.S. Cl. .................. 219/117.1; 219/118
(58) Field of Classification Search ......... 219/117.1, 219/118, 69.15, 84; 148/320
    See application file for complete search history.

(56) References Cited

U.S. PATENT DOCUMENTS

| | | | | |
|---|---|---|---|---|
| 2,415,573 A | * | 2/1947 | Adams et al. ............. | 428/594 |
| 2,790,891 A | * | 4/1957 | Welsh ..................... | 219/91.2 |
| 3,214,564 A | * | 10/1965 | Katzer et al. .............. | 219/92 |
| 5,066,845 A | * | 11/1991 | Anderson ................. | 219/119 |
| 5,431,748 A | * | 7/1995 | Maeda et al. .............. | 148/320 |
| 6,646,221 B1 | * | 11/2003 | Wang et al. ............... | 219/118 |
| 6,806,436 B1 | * | 10/2004 | Katou et al. .............. | 219/86.9 |

FOREIGN PATENT DOCUMENTS

GB    2358826    *    8/2001

* cited by examiner

*Primary Examiner*—Kevin Kerns
*Assistant Examiner*—Michael Aboagye
(74) *Attorney, Agent, or Firm*—Kathryn A. Marra

(57) ABSTRACT

The formation of spot welds in high strength steel workpieces is improved by using welding electrodes with annular, or donut shaped welding tips for the formation of the molten metal weld pool at the weld site. The annular poll solidifies to form an annular weld nugget. Preferably the donut shaped nugget has an internal diameter that is no more than three-quarters of the outside diameter. The method is applicable to carbon steel workpieces with allowing elements for strengthening, and to thick sheets of mild carbon steels.

6 Claims, 1 Drawing Sheet

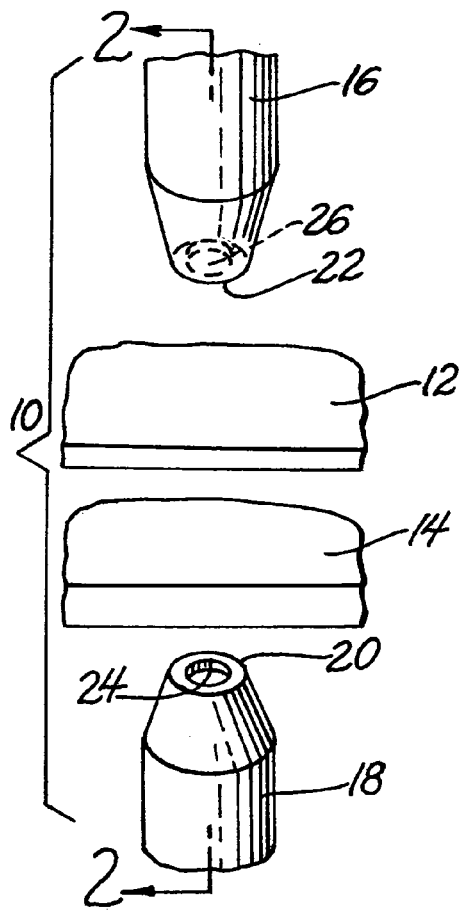
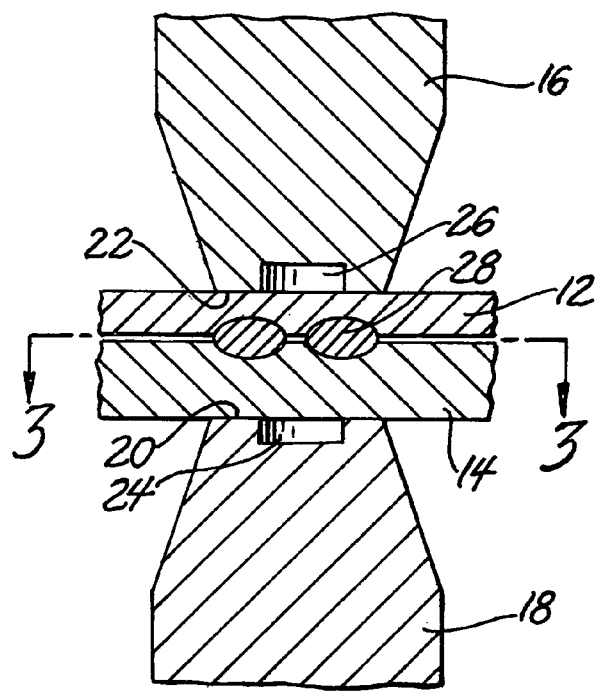
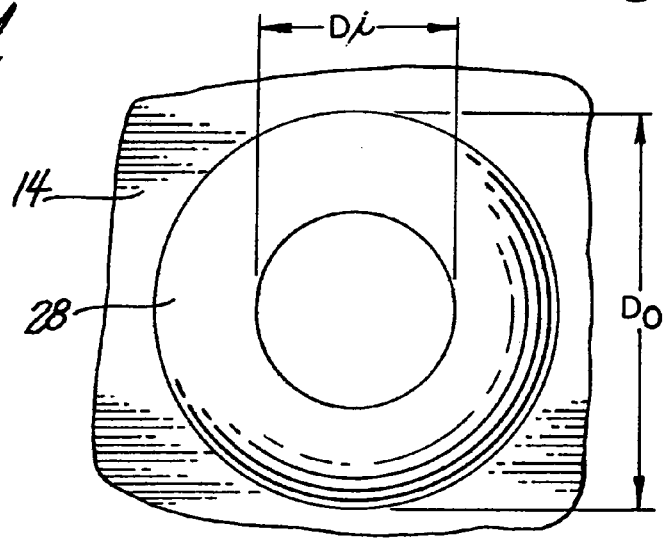

RESISTANCE WELDING OF HIGH STRENGTH STEELS

TECHNICAL FIELD

This invention pertains to electrical resistance spot welds in high strength steel alloy workpieces. More specifically, this invention pertains to a method of making annular spot welds in sheet metal material of high strength steels.

BACKGROUND OF THE INVENTION

Low carbon steel sheet material has been used for many years to make automobile body panels, other body parts, and other vehicle components. Common low carbon steels, without strengthening alloy constituents, are readily shaped in sheet form and readily welded. In an effort to reduce vehicle weight, higher strength steels have been devised so that thinner and lighter steel sheet parts and other lighter steel components could be designed. In many applications it has been difficult to form suitable electrical resistance spot welds in such high strength steel components along with proper quality inspection in a high production rate manufacturing operation.

Repetitive spot welding operations are set-up to form one or more round weld nuggets between assembled high strength steel parts, typically using automated welding equipment. Opposing round electrodes engage opposite sides of the assembly under a controlled set-up force and a controlled welding current is momentarily passed between the electrodes and interposed workpiece to briefly fuse metal at the welding interface. When the current is stopped, the molten metal solidifies to form the familiar round weld nugget of the steel workpiece material.

The welding operation is set-up and often computer controlled to produce a continuous sequence of suitable welds in accordance with specified welding process parameters. It is an object of this invention to provide a method of producing repetitive spot welds in high strength steel alloy workpieces that further facilitates the formation of welded connections in such workpieces.

SUMMARY OF THE INVENTION

This invention is particularly applicable to resistance welding operations with respect to a class of high strength, relatively low alloy content, sheet steel materials that have been developed by the steel industry for automotive vehicle applications. These steels differ from other steel alloy compositions that are used in the automotive industry, such as stainless steels and tool steels, in that they have a relatively low content of alloying constituents including carbon. Representative high strength steels contain many, if not all, of the following elements in amounts that total to less than 2% to 4% by weight of the total composition: aluminum, carbon, chromium, manganese, molybdenum, niobium, nickel, phosphorus, sulfur, silicon, titanium and vanadium. Carbon is present, usually in the range of about 0.06–0.25% by weight and manganese is present, usually in the range of about 0.4–1.7% by weight. These high strength steels have a yield stress greater than 36,000 pounds per square inch (244 MPa).

It has been found that doughnut shaped resistance weld nuggets produced in high strength steels enhance properties of the welded joint and assembly. Such doughnut or torus shaped weld nuggets, when produced with a Di/Do ratio, suitably less than 0.75 provide desirable weld nugget strength characteristics in high strength steel workpieces. Di and Do refer to the internal diameter and external diameter of the weld nugget, respectively. High strength steel weld nuggets of doughnut shape are produced by using at least one annular (or doughnut tip shaped) welding electrode.

The annular shape of the high strength steel nugget appears to increase its strength such that if a welded high strength steel member assembly is pulled apart in a test intended to destroy a welded bond, the steel weld nugget is pulled from the surrounding workpiece steel material and the fracture is not interfacial, i.e. through the nugget itself.

The welding operation is set-up with two opposing doughnut shaped electrodes (or one doughnut electrode tip with a flat opposing electrode plate, if precise electrode alignment is difficult in setup of a welding assembly) and suitable clamping force and weld current determined. The outer diameter of the annular nugget will typically be larger than the round nugget that might otherwise be formed. Since the fuse area of the annular spot weld is substantially the same as the solid spot weld, no additional weld current is required.

Thus, this invention enables the formation of spot welds joining high strength steel sheets where the fused and re-solidified, alloy steel weld material nugget is strong enough to survive destructive testing of the welded interface. This method may also be used beneficially for spot welding of mild carbon steel sheets where at least one of the sheets is more than about three millimeters thick. Other objects and advantages of the invention will be understood from a description of preferred embodiments which follows.

BRIEF DESCRIPTION OF THE DRAWINGS

FIG. 1 is an exploded view of an assembly of two high strength steel alloy sheet workpieces and opposing copper electrodes with donut shaped welding tips.

FIG. 2 is a vertical cross-section of the assembly of FIG. 1, in the location and direction 2—2 indicated in that Figure, as the donut shaped weld nugget is produced.

FIG. 3 is a plan view cross-section of the assembly of FIG. 2 in the 3—3 indicated location and direction.

DESCRIPTION OF PREFERRED EMBODIMENTS

High strength steels are commercially available and in sheet metal forms. In automotive applications the thickness of the sheet metal is often in the range of 0.6 mm to 4 mm. As stated above, these steels are iron based alloys with carbon, manganese and other alloying elements. The materials have various compositions as shown in the following Table. The steels are available in various grades identified as high strength low alloy steel (HSLA), transformation induced plasticity steel (TRIP), martensitic steel, dual phase steel and a Japanese grade material designated TS 590, a precipitation strengthened steel. There is variation in their overall composition and processing but each of such steels may be welded by the process of this invention. Carbon and manganese are common to each of the alloys and most also contain relatively small amounts, less than 0.1% each, of aluminum, chromium, copper, molybdenum, niobium nickel, phosphorus, sulfur, silicon, titanium and vanadium. The thermomechanical processing of the cast alloys to their sheet form, of course, contributes to their mechanical properties.

| STEEL | ALLOYING ELEMENT (wt %) | | | | | | | | | | | | |
|---|---|---|---|---|---|---|---|---|---|---|---|---|---|
| GRADE | Al | C | Cr | Cu | Mn | Mo | Nb | Ni | P | S | Si | Ti | V |
| HSLA 340 | 0.01 | 0.06 | 0.02 | 0.03 | 0.49 | 0.01 | 0.03 | 0.02 | 0.01 | 0.01 | 0.1 | 0.01 | <0.01 |
| TRIP 800 | 0.03 | 0.2 | <0.01 | 0.01 | 1.63 | <0.01 | <0.01 | 0.03 | 0.02 | <0.01 | 1.7 | 0.02 | 0.01 |
| Martensitic Steel (M220-Grade 15) | 0.03 | 0.25 | 0.02 | 0.02 | 0.46 | <0.01 | <0.01 | 0.03 | 0.01 | 0.01 | 0.1 | 0.06 | 0.01 |
| Dual Phase (DP 600) | 0.02 | 0.11 | 0.21 | 0.01 | 1.43 | 0.05 | <0.01 | 0.03 | 0.01 | <0.01 | 0.4 | 0.02 | 0.01 |
| TS 590 | 0.02 | 0.09 | 0.18 | <0.01 | 1.64 | 0.01 | <0.01 | 0.03 | 0.03 | <0.01 | 0.3 | 0.01 | 0.06 |

FIG. 1 is an exploded view, schematically illustrating a simplified assembly 10 of fragments of an upper sheet layer 12 of high strength steel and a lower sheet 14 of high strength steel. Poised above workpiece sheet 12 is upper, copper, electrical resistance welding electrode 16. And positioned below lower sheet 14 workpiece is lower, copper, electrical resistance welding electrode 18. In a welding operation setup for making a spot weld between sheet layers 12 and 14, welding electrode 16 and welding electrode 18 are positioned on a welding axis in opposition to each other. Welding electrodes 16 and 18 are carried in a welding gun, or other suitable welding head, and are moved between an open position in which an assembly of sheet 12 and sheet 14 is placed between them, and a closed position where welding electrode 16 presses at a welding site on the upper surface of sheet 12 and welding electrode 18 presses at an opposing welding site on the lower surface of workpiece sheet 14.

Welding guns are well known and not illustrated in the drawings of this specification. But the welding apparatus presses the welding electrodes 16 and 18 against sheets 12 and 14 with a predetermined welding force and conduct a predetermined momentary welding current through sheets 12, 14 to produce a spot weld. The welding apparatus then opens for re-positioning or removal of the sheets.

In the practice of this invention for welding high strength steel workpieces, electrode 18 has an annular welding tip 20. Electrode 16 has a tip 22 of like annular shape. See FIGS. 1 and 2. Welding tips 20, 22 preferably have flat contact surfaces, as best seen in FIG. 2, for good face-to-face electrical contact with the engaged surfaces of sheet 12 and 14. But each tip 20, 22 has a hollowed out portion 24 and 26, respectfully, to produce the annular contact tip face.

The cross-sectional view of FIG. 2 shows electrodes 16 and 18 in pressing contact with opposite surfaces of workpiece sheets 12 and 14. Welding tip 22 of electrode 16 has a cylindrical relieved portion 26 so that the tip to surface contact with sheet 12 is annular in shape. Likewise, the tip 20 of electrode 18 has a cylindrical relieved portion 24 which permits annular tip face to surface contact with sheet 14. As a suitable welding current is momentarily passed between welding electrode 18 and welding electrode 16 through the contacted regions of sheets 12 and 14, an annular pool of molten metal is first formed. Then, as the electrodes are withdrawn, the pool rapidly dissipates heat into the surrounding metal and solidifies into nugget 28. Weld nugget 28 is in the shape of a donut or torus, or like annular body, as seen in cross-section in FIG. 2 and in plan view in the fragmentary FIG. 3. In accordance with this invention, the donut shaped weld nugget 28 has an external diameter, or outer diameter, indicated at $D_o$ in FIG. 3. Weld nugget 28 also has an inner diameter, $D_i$, as labeled in FIG. 3. The size and shape of electrode tips 20 and 22 is such that a weld nugget 28 is produced in which the inner diameter, $D_i$, is no greater than 75% of the outer diameter $D_o$. The goal of this welding practice is to produce an annular shaped weld nugget body that is likely to be larger in its outer diameter than a typical solid round weld nugget body that it replaces. Furthermore, the inner diameter of the donut shaped weld nugget body is less than three-quarters of the outer diameter so that there is suitable weld nugget volume and strength and face-to face contact with the sheet metal workpieces 12 and 14 that it joins.

Often workers in welding operations test the integrity or strength of the welded interface between two such sheet metal workpieces as sheets 12 and 14. It is the intent and preferred embodiment of this invention that the annular weld nugget is sized so that when the respective sheet layers are gripped and forcibly pulled apart in a destructive test, the weld nugget itself remains un-fractured. The separation of the welded sheets in this destructive test occurs by one sheet, for example sheet 12, being pulled away from the weld nugget body 28 that binds it to sheet 14. In other words, the destructive test produces a sheet and weld nugget fragment like that depicted in FIG. 3. Weld nugget 28 remains in one of the steel sheets, here lower sheet 14, and the weld nugget itself is not fractured.

Thus, it is found that the use of copper welding electrodes with flat, annular contacting tips can be suitably sized, in combination with suitable welding force, current and time parameters, to produce donut shaped weld nuggets. Such annular weld nuggets, with Di/Do of 0.75 or less, provide excellent interfacial welded bonds between high strength sheet metal workpieces.

The spot welding process of this invention was developed for welding high strength steels with alloying elements as described above. But it also has application to mild carbon steel (without additions of alloying elements for strengthening) especially when relatively thick sheets or sections (>3 mm) of the steel is to be spot welded. Low carbon steels are iron based compositions containing carbon (up to, for example 0.15–0.25%) and usually manganese (for example, about 0.5%) with incidental impurities such as sulfur and phosphorus.

While the invention has been described in terms of a preferred embodiment it is appreciated that other embodiments could readily be adapted by ones skilled in the art. Accordingly, the scope of the invention is intended to be limited only by the following claims.

The invention claimed is:
1. A method of forming a welded bond at a weld site that includes an interface between first and second high strength steel workpieces, the high strength steel containing, by weight, at the weld site, 0.06–0.25% carbon, 0.4–1.7% manganese and one or more of the elements selected from the group consisting of aluminum, chromium, molybdenum, niobium, nickel, phosphorus, sulfur, silicon, titanium and vanadium, the method comprising:

passing an electrical current through said workpieces at said weld site to form an annular pool of molten steel material at said interface; and, thereafter stopping said electrical current for solidification of said molten material into an annular weld nugget bonding said workpieces at said interface said annular weld nugget having a central opening with no weld nugget material therein.

2. The method of forming a welded bond as recited in claim 1 comprising pressing a first welding electrode against said first workpiece at said weld site, said first welding electrode engaging said first workpiece with an annular welding tip and a second electrode against said second workpiece at said weld site, said second electrode being in aligned opposition to the first welding electrode; and passing an electrical current through said workpieces at said weld site to form an annular pool of molten alloy at said interface said annular weld nugget having a central opening with no weld nugget material therein.

3. The method of forming a welded bond as recited in claim 2 in which said second electrode has an annular welding tip.

4. The method of forming a welded bond as recited in claim 2 in which said second electrode engages said second workpiece with a continuous flat surface.

5. The method of forming a welded bond as recited in claim 1 in which said annular weld nugget has an internal diameter that is no more than three-quarters of the diameter of the outside diameter.

6. The method of forming a weld bond as recited in claim 1 in which said high strength steel workpieces each have a yield strength of 36,000 pounds per square inch (244 MPa) or greater.

* * * * *